INVENTOR.
Byron L. Brucken
BY Frederick M. Ritchie
ATTORNEY

# United States Patent Office 3,493,118
Patented Feb. 3, 1970

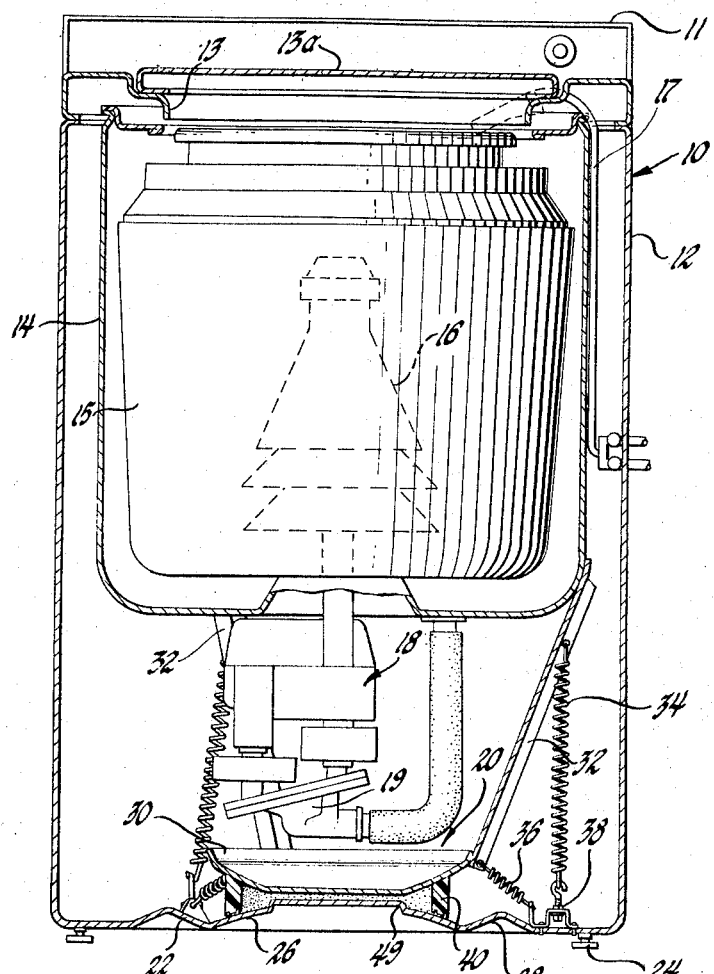

3,493,118
DOMESTIC APPLIANCE SUSPENSION
Byron L. Brucken, Dayton, Ohio, assignor to General Motors Corporation, Detroit, Mich., a corporation of Delaware
Filed Oct. 9, 1968, Ser. No. 766,198
Int. Cl. B01d 33/06, 33/02
U.S. Cl. 210—364                    5 Claims

ABSTRACT OF THE DISCLOSURE

In the preferred form, a suspension system for a domestic clothes washer having a base with an upwardly facing convex surface and a supported mass with a downwardly facing convex surface, the suspension system including a concavo-concave self-locating shuttle ring located between the two convex surfaces and a plurality of springs centrally locating the supported mass with respect to the base.

---

This invention relates to a suspension system for a domestic appliance and more particularly to a suspension system for a domestic spin tub type clothes washer having a rotatable mass.

In the washing machine art, several types of suspension systems have been used to reduce transfer of vibration from the movable mass system to the base and casing of the washing machine. One such suspension is the shuttle type suspension taught in detail in the patent to Brucken et al. 3,269,544 issued Aug. 30, 1966. The shuttle type suspension utilizes a shuttle located between two surfaces in the suspension system and may be designed to provide for a shift of a nodal point during different modes of vibration of the movable mass. The present invention is directed to an improvement or modification of the shuttle type suspension system.

One object of the present invention is to substantially eliminate or minimize the transmission of oscillations or vibrations due to disturbing forces created by the rotation of unbalanced loads to the supporting framework of centrifugal machines.

Another object of the present invention is to substantially eliminate the transmission of oscillations or vibrations due to the disturbing forces acting through a rotatable mass in a movable mass system to a supporting framework associated therewith by guidingly supporting the weight of the movable mass system without materially altering the natural vibrational displacements thereof.

Another object of the present invention is to provide an improved support arrangement for a movable mass system by the provision of a plurality of frictional dampening interfaces with each of the frictional surfaces at each interface being independent of its mating frictional surfaces except for forces applied through the interface.

A still further object of the invention is to improve support arrangements for a movable mass system by the provision of a shuttle member being independent of either the movable mass system or a supporting framework therefor, except for forces transmitted from the movable mass system to the supporting framework through the shuttle.

In accordance with the above object, a further object of the invention is in an improved support arrangement for a movable mass system, the provision of an independent snubber member which can favorably aid in the change of the nodal point of vibration of a movable mass system with respect to the movable mass system upon an application of forces through the shuttle member.

Another object of the present invention is an improved shuttle type suspension system which is self-draining or self-cleaning.

Further objects and advantages of the present invention will be apparent from the following description, reference being had to the accompanying drawings wherein preferred embodiments of the present invention are clearly shown.

Figure 3:
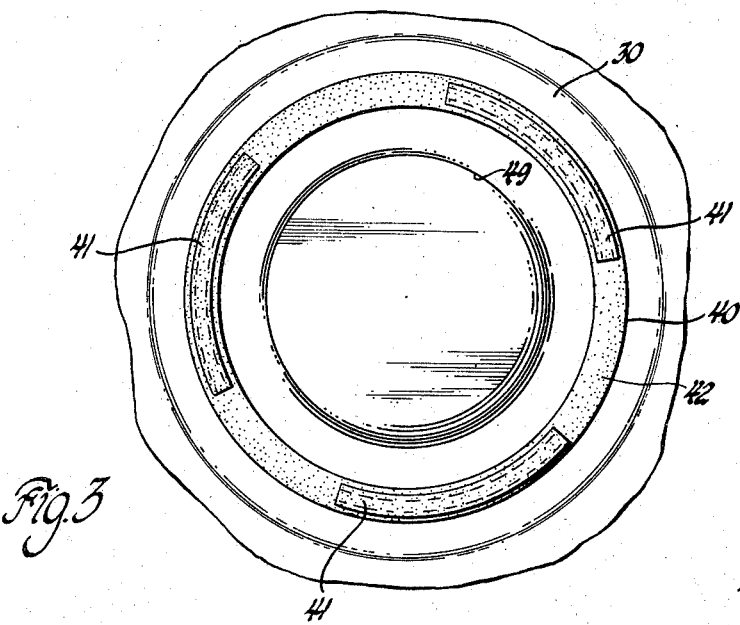
Figure 4:
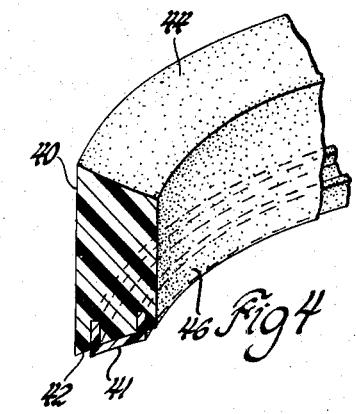
Figure 6:
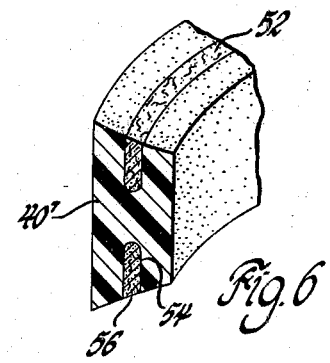
Figure 5:
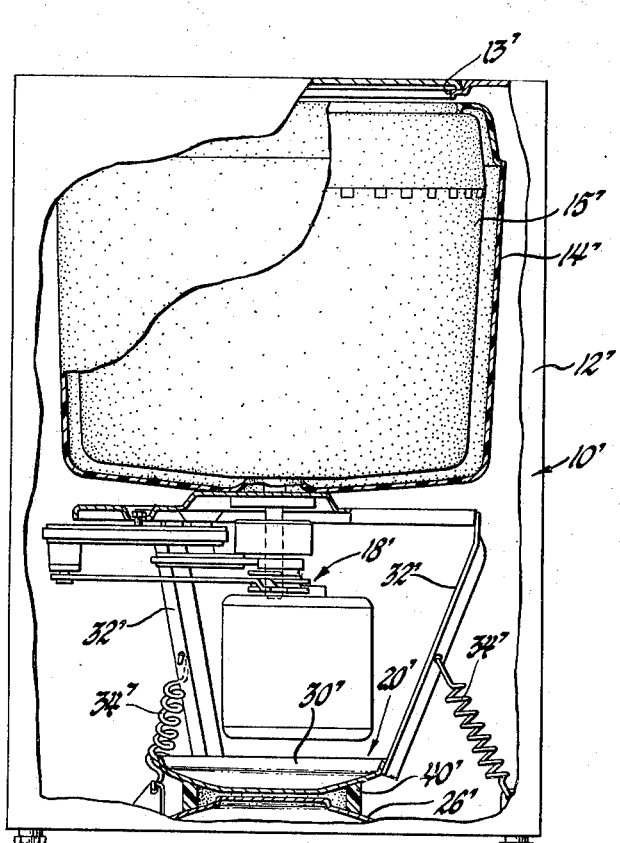

In the drawings:
FIGURE 1 is a schematic sectional front view partly in elevation of a clothes washer including one embodiment of the supporting arrangement of the present invention;
FIGURE 2 is an enlarged view of a lower sectional portion of FIGURE 1;
FIGURE 3 is a horizontal sectional view taken along line 3—3 of FIGURE 2;
FIGURE 4 is a perspective end sectional view of the shuttle shown in FIGURE 3;
FIGURE 5 is a schematic sectional front view partly in elevation of another clothes washer including another embodiment of the supporting arrangement of the present invention; and
FIGURE 6 is a perspective end section of a modification of the shuttle used in the present invention.

In accordance with this invention and with reference to FIGURE 1, a clothes washer 10 is comprised of a control housing 11 and a casing 12. The casing 12 is provided within an upwardly opening access opening 13 and lid 13a. Located within the casing 12 is a cylindrical water container or outer tub 14. Concentric with the water container 14 is a perforate inner tub or spin tub 15 which is rotatably mounted with respect to the water container 14. Concentrically mounted within the spin tub 15 is a vertically reciprocable agitator 16 which is utilized to circulate or agitate water admitted to the spin tub through the water supply conduit 7. Mounted directly below the water container 14 is an agitating and spin mechanism 18 which also includes a pump 19. Conventional washer controls and timer means are included on the control housing 11 to selectively admit water or a washing fluid through the water supply conduit 17 to the spin tub 15 and to control the agitating and spin mechanism 18 so as to selectively reciprocate the agitator 16 or rotate the spin tub. When the spin tub is being rotated, the pump 19 is utilized to drain water which has been centrifugally removed from the spin tub 15 through the perforations thereof into the water container 14. Further details of the agitating spin mechanism 18 and the operation thereof are set forth in the United States patent to Brucken 3,087,321, issued Apr. 30, 1963. It should be understood that the above-described arrangement between the spin tub 15, water container 14 and the spin mechanism 18 is merely representative of a typical washing machine having a rotatably driven spin tub.

For operation of the washing machine 10, clothes, or a washing load, are inserted into the spin tub 15 through the access opening 13. A predetermined quantity of water is then supplied to the spin tub 15 through the water supply conduit 17. The water container 14, rotatable spin tub 15, agitator 16 and the agitating and spin mechanism 18 are mounted as a unitary movable mass system within the casing 12. The weight of the movable mass is further increased by the clothes and water inserted into the spin tub. It is common in a typical washing machine to have wet clothes lump into an unbalanced mass in the spin tub, thereby creating a disturbing force on the movable mass system during rotation of the spin tub. This disturbing force causes the movable mass system to gyrate and wobble in a manner to produce substantial lateral forces or disturbances within the casing 12. This invention provides an improved suspension system of the shuttle type taught in my earlier patent 3,269,544.

The improved shuttle type suspension system is shown generally at 20 and includes a base plate or base member 22 of the washing machine casing 12. The base member 22 may be provided by a plurality of feet 24, one located at each corner of the washing machine. The feet 24 may be fixed with respect to the base 22, but in the preferred form are adjustable so that the washing machine can be leveled when installed. Centrally located in the base 22 is an upwardly projecting spherical convex portion 26. The convex portion is formed in the washing machine base but may be a separate member. In the preferred form, the base 22 is also provided with an upward standing annular ridge 28 which along with the convex portion 26 increases the rigidity of the base 22.

A downwardly facing convex support member 30 is joined to the washing water container 14 by a plurality, preferably three, upwardly directed braces or struts 32. Since the spin tub 15, agitator 16 and agitating and spin mechanism 18 are all mounted for movement with the water container 14, the support member 30 supports the entire movable mass through the braces 32. A vertical spring 34 and a substantially horizontal spring 36 join each of the braces 32 with the base plate 22. The springs 34 and 36 may be joined with the base 22 in any known manner. However, in the preferred form, the vertical springs 34 are joined to the base 22 by means of an adjustable connection 38. The adjustable connection 38 is used to vary the tension of the vertical springs 34. The specific adjustable connection shown consists of a nut 38a and eye bolt 38b. The nut is double headed with a central outwardly projecting flange 38c. The nut is positioned so that the flange engages a bracket 39 fixed to the base plate 22. Since the nut is double headed, it may be turned from either the top or bottom of the bracket, thus adjusting the tension of the vertical spring 34 through the eye bolt.

Located between the convex portion 26 of the base and the support member 30 is an annular shuttle member or ring 40. As best shown in FIGURE 2, the shuttle member 40 has a downwardly facing spherical concave surface 42 which mates with the upwardly facing spherical convex portion 43 of the base to form a first interface. The shuttle 40 also has an upwardly facing spherical concave surface 44 which mates with the downwardly facing convex surface 45 of the support member 30. As shown in FIGURES 2 and 3, the shuttle 40 is a cylindrical member having a central or radially inner wall 46. The inner wall 46 defines a substantially open or void space 48.

As is readily seen, the total weight of the supported or movable mass including the water container and the drive mechanism is totally supported by the shuttle ring 40. The weight is applied through the braces 32 to the support member 30 through the top or second interface of the shuttle ring 40 to the bottom or the first interface, then to the base plate 22 which acts as a fixed support. When the supported mass is caused to move with respect to the fixed support or base, the shuttle member 40 may move with respect to the spherical surface of the convex portion 26 along the first interface. Also, the support member 30 may move with respect to the shuttle ring 40 along the top or second interface. As there is no direct interconnection between the shuttle ring and either the base plate 22 or the support member 30, the shuttle ring is free to move with respect to either or both of these surfaces as forces are applied to the shuttle ring through the first and second interfaces. The tension of the vertical springs add forces to be applied to the shuttle ring through the interfaces. Both sets of springs are utilized to maintain the supported mass in the centered position with respect to the fixed support of the base plate 22 and to limit the movement of the vertical axis of the supported mass from vertical when the disturbing forces are applied.

The weight of the supported mass and the spring forces cause frictional forces at the interfaces when the supported mass is moved with respect to the base plate 22. These frictional forces dampen the movement of the suspended mass with respect to the fixed support. Thus, a suspension is obtained where a single shuttle member provides two oppositely directed interfaces to control movement of the supported mass with respect to the fixed support and whereby the shuttle member is unfettered and uncontrolled with respect to either the supported mass or the fixed support except through forces applied to the shuttle member through the two oppositely curved interfaces.

The weight of the supported mass and the spring forces cause a pinching or wedging affect on the shuttle between the two convex surfaces. This pinching action limits the lateral movement of the shuttle. A raised circular projection 49 may be formed on the convex portion of either the base plate 22 or the support member 30 to further limit excessive lateral movement of the shuttle. The shuttle member is thus independent of both the support member and the base plate of the fixed support.

When the shuttle member is shifted laterally with respect to the fixed support, the vertical springs tend to maintain the axis of the supported mass vertical by pivoting the support member with respect to the now shifted shuttle at the second curved interface. The springs act only against the frictional forces of the second interface and the disturbing force. Except for these frictional forces applied, the support member is free to move with respect to the shuttle member and thus there is no outside controlling force resisting the forces of the springs 34 and 36 in maintaining the axis of the supported mass of vertical position. Since the shuttle member is located between two oppositely curved members, the forces of the weight of the suspended mass and the springs tend to center the shuttle.

The clothes washer suspension of this invention also includes two opposing convex surfaces such as 43 and 45 which are generated by different radii. When the spin tub is rotated with an unbalanced load of clothes, a disturbing force is created which forces the movable or supported mass into a nutation or wobble with respect to its fixed support. The amount of this movement is proportional to the amount of the disturbing force and the location of the disturbing force with respect to the center of gravity of the supported mass. However, the two interfaces and the frictional forces applied thereto also affect the movement of the supported mass. By controlling the radii of the interfaces, it is possible to have some control over the frictional forces applied in counteracting the disturbing force. By making the spherical radius of the downwardly facing convex surface 45 less than the spherical radius of the upwardly facing convex surface 43, it is found that the applied forces will move more easily on the upper interface due to a decrease in frictional forces to be overcome, and thus produce less resisting force against the forces of the spring biasing the supported mass into an upright or vertical position.

One suitable working embodiment of the type of suspension shown in FIGURE 1 is a clothes washer having an empty supported mass of approximately 100 pounds and a full-load, including clothes and water, supported mass of approximately 154 pounds. This supported mass is centered by vertical springs 34 having a 23 pound per inch spring rate and horizontal springs 36 of approximately 5 pounds per inch. The top interface formed by the bottom convex surface 45 of the support member 30 and the upper concave surface 44 of the shuttle 40 has a spherical radius of approximately 8 inches. The bottom interface formed by the lower concave surface 42 of the shuttle 40 and the upper convex surface 43 of the convex portion 26 of the base 22 has a spherical radius of approximately 12 inches. The bottom surface 46 of the convex support member 30 and the top surface 43 of the convex portion 26 of the base member 22 carry a layer of porcelain.

The shuttle 40 is made from a thermoplastic acetal resin represented by the structural formula

and sold under the trade name "Delrin." The lower concave surface 42 has a plurality of inserts 41 made of approximately 80% polytetrafluoroethylene sold under the trade name "Teflon," 15% glass, and 5% molybdenum. These inserts are shown in FIGURES 3 and 4. The shuttle 40 has an outside diameter of 7.76 inches and an inside diameter of 6.76 inches, thus providing a radial thickness of .500 inch. The shuttle has a depth of 1.24 inches at its outside diameter from the top and bottom faces being inwardly tapered at an angle from the horizontal of approximately 27° and 17°30' respectively.

The faces of the shuttle are flat when manufactured but wear into curved surfaces having spherical radii of curvature corresponding with the spherical radii of curvature of the respective mating convex surfaces. Even at the top surface of the shuttle with the smaller spherical radius, this wearing in will amount to less than .004 inch.

FIGURE 5 discloses a second embodiment of the invention in which a clothes washer 10' having an outer casing 12' with a top loading access opening 13' is provided with a light weight plastic water container 14' and spin tub 15'. The agitating and spin mechanism 18' provides an oscillatory motion for the spin tub during the wash cycle and a rotary motion of the spin tub during the spin cycle. The spin tub 15', water container 14' and mechanism 18' along with the clothes load and water supplied to the spin tub provide the movable mass of the machine. As in the suspension system described above in connection with the first embodiment, the suspension system 20' of this machine includes an upwardly directed spherical convex portion 26' extending upwardly from the base of the machine and a downwardly facing spherical convex support member 30' joined to the suspended mass by three braces 32'. Due to the lower weight of this type of machine, each pair of a horizontal and a vertical spring of the first embodiment is replaced by a single spring 34' which joins each brace 32' with the casing or base of a machine.

In this second embodiment of the machine, the spherical radius of curvature of both the support member 30' and the upwardly directed convex portion 26' of the base is 12 inches. The machine has an empty supported mass weight of approximately 55 pounds and a fully loaded movable weight of approximately 81 pounds. The three springs 34' have a spring rate of approximately 20 pounds per inch. The center of gravity of the supported mass of this machine is below the bottom of the spin tub and thus the disturbing force due to an unbalanced loading of clothes in the spin tub is always above the center of gravity of the suspended mass. With this in mind, the suspension system is found to perform adequately with a 12-inch radius of both interfaces.

In this second embodiment, the upwardly directed convex portion 26' of the base and the downwardly directed convex portion of the support member 30' are formed from galvanized steel with the shuttle ring being formed of a material comprising a mixture of polyethylene, nylon and other polymers and impregnated with oil, sold under the tradename "Polyoil G" by Polymer Co. It is noted that again in this machine the shuttle member 40' is independent or unfettered with respect to either the support member 30' or the upwardly facing convex portion 26' except through the forces applied to the shuttle through the interfaces due to the weight of the suspended mass and the spring forces.

FIGURE 6 shows a modification of the shuttle member which may be utilized in the shuttle type suspension of a washing machine. Material such as polypropylene, polyethylene and nylon have also been found attractive for use in the shuttle besides the materials mentioned above. It is sometimes found beneficial to add a lubricant to the interfaces between the shuttle member and the support member or the base convex portion although this is not always necessary. The shuttle 40' of FIGURE 5 is provided with a groove 52 on the upwardly facing surface and a groove 54 on the downwardly facing surface. The grooves 52 and 54 may be either left empty or filled with a lubricant supplying material 56. The lubricant provided may be of either the constant viscous type or of the variable dampening viscous type. In the latter form, the lubricant will be responsive to temperature so that upon an increase of friction, the temperature rises and thus reduces the viscosity of the lubricant. Therefore, when the spin tube is rotated at higher angular velocities, and thus the oscillation is at a higher frequency to cause an increase in friction (and temperature) at the shuttle interfaces, the lubricant will provide for a decrease in the dampening forces applied through the shuttle suspension. This provides the advantage in a suspended mass system of increased dampening of the oscillations of a suspended mass below its critical speed along with decreased dampening of its oscillations once the suspended mass has passed through its critical speed.

The concavo-concave type shuttle used between two convex surfaces has the further advantage of being self-cleaning or self-draining and thus reduces the maintenance of the suspension system. Since the lower surface of the suspension system is an upwardly directed spherical convex portion, any debris or dirt collected in the area tends to move radially outwardly. This reduces the tendency of this material to collect in the void space 48 where it may possibly interfere with the operation of the shuttle at the interfaces.

While the embodiments of the present invention as herein disclosed constitute preferred form, it is to be understood that other forms might be adapted.

I claim:

1. In combination with a washing machine having a movable mass including a rotatable spin tub adapted to contain clothes in a washing fluid during a wash cycle and a mechanism to rotate said spin tub after said wash cycle to centrifugally remove the washing fluid from said clothes, a suspension system comprising: a fixed support member having an upwardly facing annular convex portion, a movable support member having a downwardly facing annular convex portion, said movable mass being secured in fixed relationship to said movable support member, an annular shuttle member located between said upwardly facing convex portion and said downwardly facing convex portion and having an internal wall defining an open space completely within the confines of said internal wall, at least a portion of each of said convex portions located within said open space, said shuttle member having an upper concave portion in mating engagement with said downwardly facing convex portion to form a first interface, said shuttle member having a lower concave portion in mating engagement with said upwardly facing convex portion to form a second interface, both of said interfaces being located below the center of gravity of said movable mass, said shuttle member being controlled in its movement relative to said fixed support member and said movable support member solely by forces applied through the interfaces by the pinching effect of said fixed support member and said movable support member, said movement of said shuttle member facilitating the closest possible proximity of said movable support member to said fixed support member within said open space, and biasing means to center said movable mass by centering said movable support member with respect to said fixed support member.

2. The combination of claim 1 wherein said shuttle member includes friction reducing means on at least one of said concave surfaces.

3. In combination with a washing machine having a movable mass including a rotatable spin tub adapted to contain clothes in a washing fluid during a wash cycle and a mechanism to rotate said spin tub after said wash cycle to centrifugally remove the washing fluid from said clothes, a suspension system comprising: a fixed support member having an upwardly facing annular convex portion, a movable support member having a downwardly facing annular convex portion, said movable mass being secured in a fixed relationship to said movable support member, an annular shuttle member located between said upwardly facing convex portion and said downwardly facing convex portion and having an internal wall defining an open space completely within the confines of said internal wall, at least a portion of each of said convex portions located within said open space, said shuttle member having an upper concave portion in mating engagement within said downwardly facing convex portion to form a first interface, said shuttle member having a lower concave portion in mating engagement with said upwardly facing convex portion to form a second interface, both of said interfaces being located below the center of gravity of said movable mass, said upper concave portion of said shuttle member and said downwardly facing convex portion of said movable support member forming said first interface having a smaller spherical radius than said lower concave portion of said shuttle and said upwardly facing convex portion of said fixed support member forming said second interface, said shuttle member being controlled in its movement relative to said fixed support member and said movable support member solely by forces applied through the interfaces by the pinching effect of said fixed support member and said movable support member, said movement of said shuttle member facilitating the closest possible proximity of said movable support member to said fixed support member within said open space, and biasing means to center said movable mass by centering said movable support member with respect to said fixed support member.

4. The combination of claim 3 wherein said shuttle member includes friction reducing means on said lower concave surface.

5. In combination with a washing machine having a movable mass including a rotatable spin tub adapted to contain clothes in a washing fluid during a wash cycle and a mechanism to rotate said spin tub after said wash cycle to centrifugally remove washing fluids from said clothes, a suspension system comprising: a fixed support member having an upwardly facing annular convex portion, a movable support member having a downwardly facing annular convex portion, said movable mass being secured in fixed relationship to said movable support member, an annular shuttle member located between said upwardly facing convex portion and said downwardly facing convex portion and having an internal wall defining a open space completely within the confines of said internal wall, at least a portion of each of said convex portions located within said open space, a raised projection extending from at least one of said convex portions located within said open space, said shuttle member having an upper concave portion in mating engagement with said downwardly convex portion to form a first interface, said shuttle member having a lower concave portion in mating engagement with said upwardly facing convex portion to form a second interface, both of said interfaces being located below the center of gravity of said movable mass, said shuttle member being controlled in its movement relative to said fixed support member and said movable support member solely by forces applied through the interfaces by the pinching effect of said fixed support member and said movable support member, said shuttle member being limited in its lateral movement by said raised projection, said movement of said shuttle member facilitating the closest possible proximity of said movable support member to said fixed support member within said open space, and biasing means to center said movable mass by centering said movable support member with respect to said fixed support member.

References Cited

UNITED STATES PATENTS 3,269,544   8/1966   Brucken et al. _____ 210—364

JAMES L. DeCASARE, Primary Examiner

U.S. Cl. X.R.

68—23